US 8,814,663 B2

(12) United States Patent
Vogel

(10) Patent No.: US 8,814,663 B2
(45) Date of Patent: Aug. 26, 2014

(54) PREDICTIVE ANALYSIS BASED ON PLAYER SEGMENTATION

(71) Applicant: SAP AG, Walldorf (DE)

(72) Inventor: Andreas Vogel, San Francisco, CA (US)

(73) Assignee: SAP AG, Walldorf (DE)

( * ) Notice: Subject to any disclaimer, the term of this patent is extended or adjusted under 35 U.S.C. 154(b) by 11 days.

(21) Appl. No.: 13/659,613

(22) Filed: Oct. 24, 2012

(65) Prior Publication Data

US 2013/0316795 A1  Nov. 28, 2013

Related U.S. Application Data

(60) Provisional application No. 61/651,428, filed on May 24, 2012.

(51) Int. Cl.
*A63F 9/24* (2006.01)
*G06F 17/40* (2006.01)
*G07F 17/32* (2006.01)

(52) U.S. Cl.
CPC ............... *G07F 17/32* (2013.01); *G06F 17/40* (2013.01)
USPC .............................................. 463/25; 463/42

(58) Field of Classification Search
USPC .......................... 463/16, 25, 42, 43; 705/14.12
See application file for complete search history.

(56) References Cited

U.S. PATENT DOCUMENTS

| | | | |
|---|---|---|---|
| 7,035,653 B2* | 4/2006 | Simon et al. .................. | 455/466 |
| 2003/0109305 A1 | 6/2003 | Gavin et al. | |
| 2005/0143174 A1* | 6/2005 | Goldman et al. ............... | 463/42 |
| 2005/0153767 A1 | 7/2005 | Gauselmann | |
| 2007/0082738 A1 | 4/2007 | Fickle et al. | |
| 2010/0041475 A1 | 2/2010 | Zalewski et al. | |
| 2010/0324908 A1 | 12/2010 | Rosser et al. | |
| 2012/0040761 A1* | 2/2012 | Auterio et al. .................. | 463/42 |
| 2012/0122570 A1 | 5/2012 | Baronoff | |
| 2012/0238353 A1* | 9/2012 | Herrmann et al. .............. | 463/25 |
| 2013/0005438 A1* | 1/2013 | Ocko et al. ....................... | 463/25 |
| 2013/0005447 A1* | 1/2013 | Lutnick et al. .................. | 463/25 |
| 2013/0029766 A1* | 1/2013 | Wickett et al. .................. | 463/42 |
| 2013/0079120 A1* | 3/2013 | Walker et al. ................... | 463/25 |
| 2013/0095460 A1 | 4/2013 | Bishop | |
| 2013/0095927 A1* | 4/2013 | Rietman ......................... | 463/42 |

* cited by examiner

*Primary Examiner* — William Brewster
*Assistant Examiner* — Jason Skaarup
(74) *Attorney, Agent, or Firm* — Fountainhead Law Group PC

(57) ABSTRACT

A game system identifies players in a game. A player model may be provided that predicts whether or not an identified player is going to make a payment. Additional player models may be provided that predict whether or not a player is going to make a payment for specific virtual items in the game. The game system may engage the identified player based on the virtual items the player is predicted to make payments on.

20 Claims, 8 Drawing Sheets

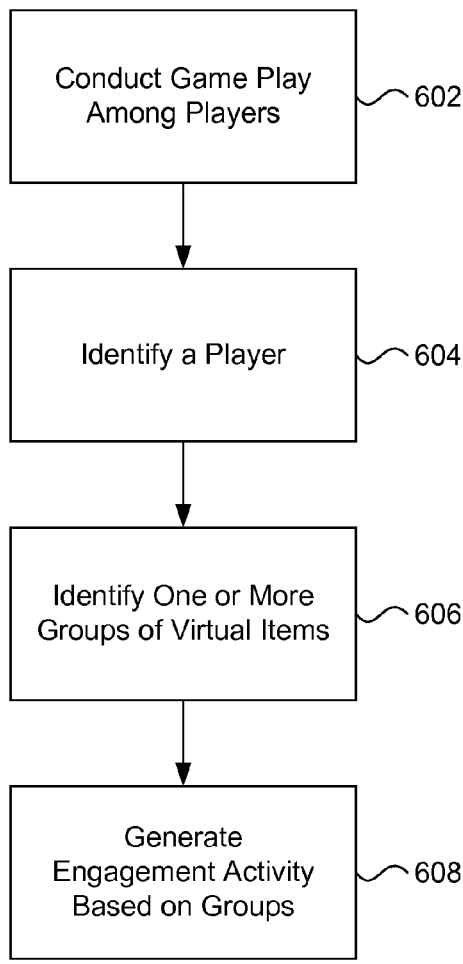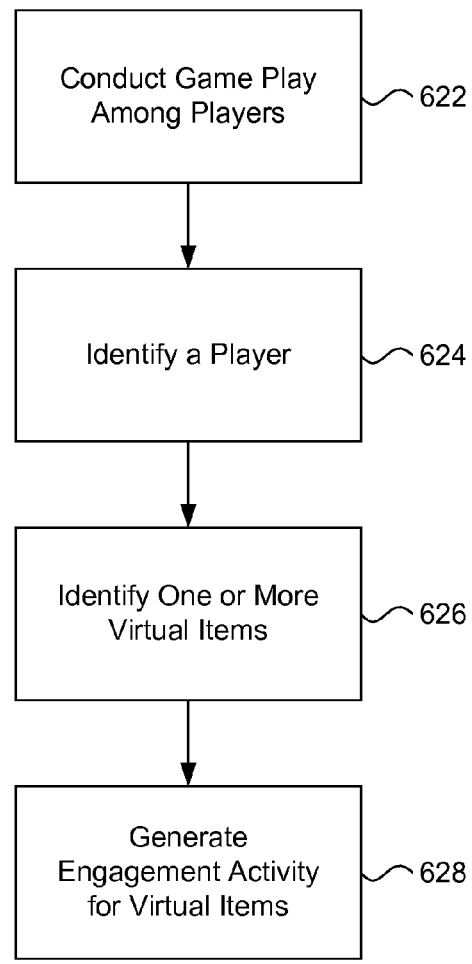
Fig. 6A
Fig. 6B

PREDICTIVE ANALYSIS BASED ON PLAYER SEGMENTATION

CROSS REFERENCE TO RELATED APPLICATIONS

The present disclosure claims priority to U.S. Provisional App. No. 61/651,428 filed May 24, 2012, the content of which is incorporated herein by reference in its entirety for all purposes. The present disclosure is related to the following commonly owned, concurrently filed applications, the disclosure of each of which is hereby incorporated by reference in its entirety for all purposes:

U.S. application Ser. No. 13/659,551, entitled "PREDICTIVE ANALYTICS FOR TARGETED PLAYER ENGAGEMENT IN A GAMING SYSTEM"

U.S. application Ser. No. 13/659,583, entitled "PLAYER SEGMENTATION BASED ON PREDICTED PLAYER INTERACTION SCORE"

U.S. application Ser. No. 13/659,517, entitled "ARTIFICIAL INTELLIGENCE AVATAR TO ENGAGE PLAYERS DURING GAME PLAY"

BACKGROUND

Unless otherwise indicated herein, the approaches described in this section are not prior art to the claims in this application and are not admitted to be prior art by inclusion in this section.

Online gaming is becoming a significant business enterprise. The Internet makes gaming accessible to players around the world. However, challenges exist to convert "free" players into "paying" players and to maintain a steady revenue from players. For example, reducing the churn rate (i.e., the number of players who leave the game after playing and never return) increases the likelihood of more paying players. Challenges exist for popularizing a game. Players may be discouraged if a game is too difficult to play. On the other hand, players may quickly loose interest if game play is not sufficiently challenging.

BRIEF DESCRIPTION OF THE DRAWINGS

FIGS. 6A and 6B illustrate workflows according to the present disclosure.

DETAILED DESCRIPTION

Disclosed embodiments relate to a gaming system that associates players with a player interaction score. The gaming system engages players in a manner based on the player interaction score. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
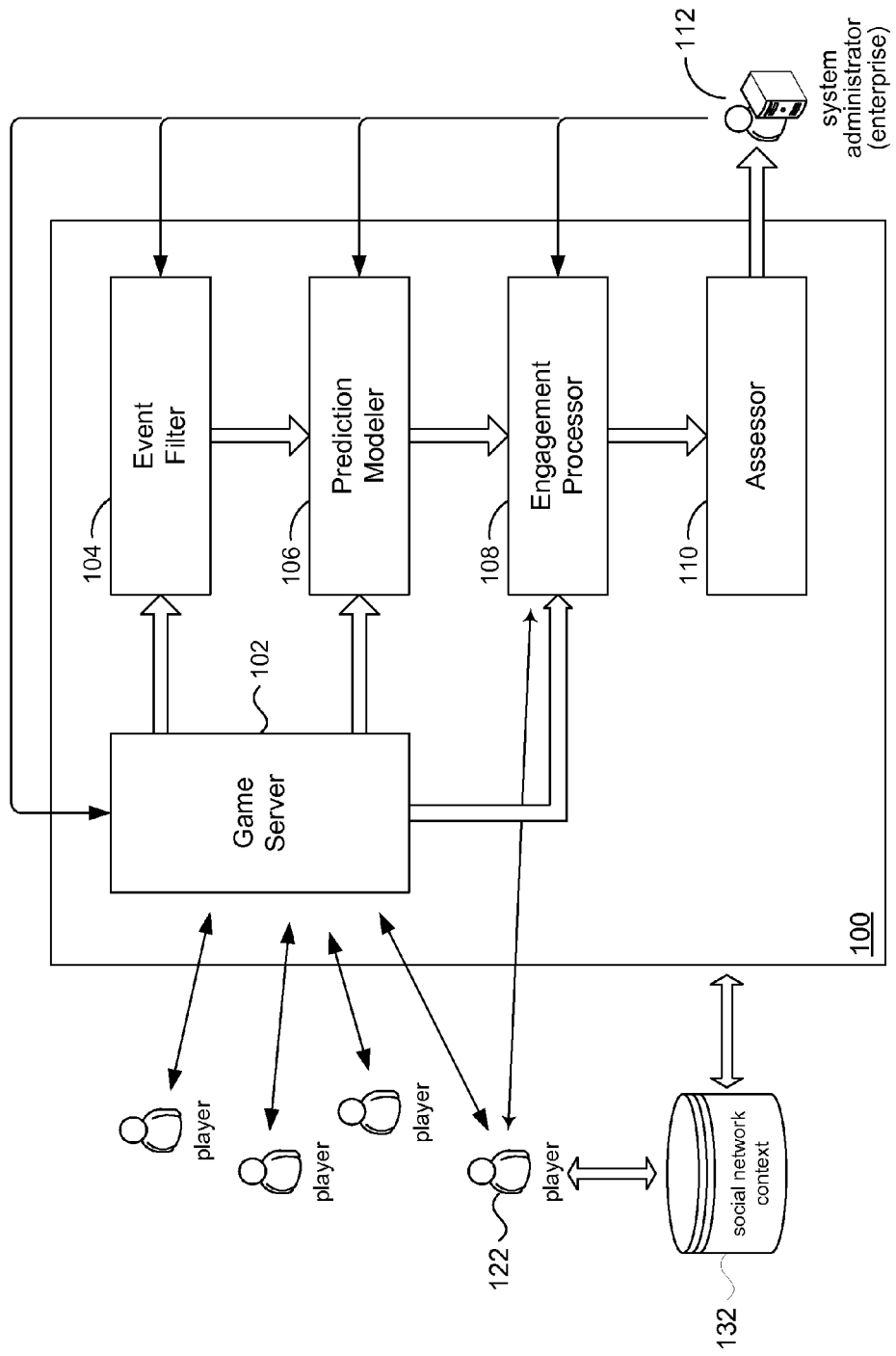
FIG. 1 shows a high-level system diagram of a gaming system according to the present disclosure.

FIG. 1 is a high level block diagram of a gaming system 100 in accordance with principles of the present disclosure. In some embodiments, the gaming system 100 may include a game server 102, an event filter 104, a prediction modeler 106, an engagement processor 108, and an assessor 110. The gaming system 100 may be hosted or otherwise operated by an enterprise ("game publisher", not shown). In some embodiments, the game may be an online game that players log onto in order to enter the game; an example of online gaming systems are known as massively multiplayer online role-playing games (MMORPG). The gaming system 100 may be free for new users, but may require payment for continued play. Players may purchase game items (e.g., weapons, ammo, transportation, etc.) in order to facilitate their progress in the game, and so on.

The game server 102 may provide a game infrastructure and game mechanics to support game play among players of the game, such as supporting a gaming environment within which players may interact with each other and with elements of the game (e.g., "game elements" such as structures, non-player characters—NPCs, and so on), maintaining and managing state changes in the gaming environment, providing interfaces for players, and so on. Events (game events) may occur during game play. For example, players' actions may cause game events; changes in a player's state may result in a game event (player dies, levels up, and so on), changes in the states of the game elements may cause game events (e.g., a weapon runs out of ammo), and so on.

Game events generated by the game server 102 during game play may be provided to the event filter 104. In accordance with the present disclosure, the event filter 104 may identify a player (e.g., player 122) based on one or more game events that occur during game play. The game event may be as simple as the player logging on to the game, or that the player has been killed, or is trapped somewhere, and so on. The game event that triggers the identification of the player may arise from the occurrence of a series of other game events involving the player or other players, or events involving game elements. In some embodiments, the event filter 104 may identify a group of players. Though the remaining description assumes the event filter 104 has identified one player, the discussion may apply equally to a group of identified players.

The prediction modeler 106 may model player behaviour to assess how likely a player (e.g., player 122) is to exhibit a specific behaviour under a given set of circumstances during game play. The prediction modeler 106 may then output one or more predictions of what the player may do (outcomes). The game server 102 may provide state information and game events generated during game play to the prediction modeler 106 as a basis for making one or more predictions about what the player may do in given their situation in the game.

The predicted outcome(s) of the prediction modeler 106 may then feed into the engagement processor 108. Based on predictions made by the prediction modeler 106 and other factors such as relevant game context and social network context 132, for example, the engagement processor 108 may generate engagement activity to engage the player. For example, the engagement activity may include actions relating to game play, actions involving commercializing aspects of game play (e.g., becoming a paying player, purchase virtual items, etc.), targeted advertising, and so on.

The assessor 110 may be used to facilitate making adjustments in various components in the gaming system 100. In some embodiments, the assessor 110 may collect data from the engagement processor 108, which may be used to assess the effectiveness of the engagement activities produced by the engagement processor. A system administrator 112 may be someone in the enterprise who can make adjustments to one or more components in the gaming system 100 based on information provided by the assessor 110. In some embodiments, the system administrator 112 is a human operator, and in other embodiments the system administrator 112 may include some degree of automation.

Figure 2:
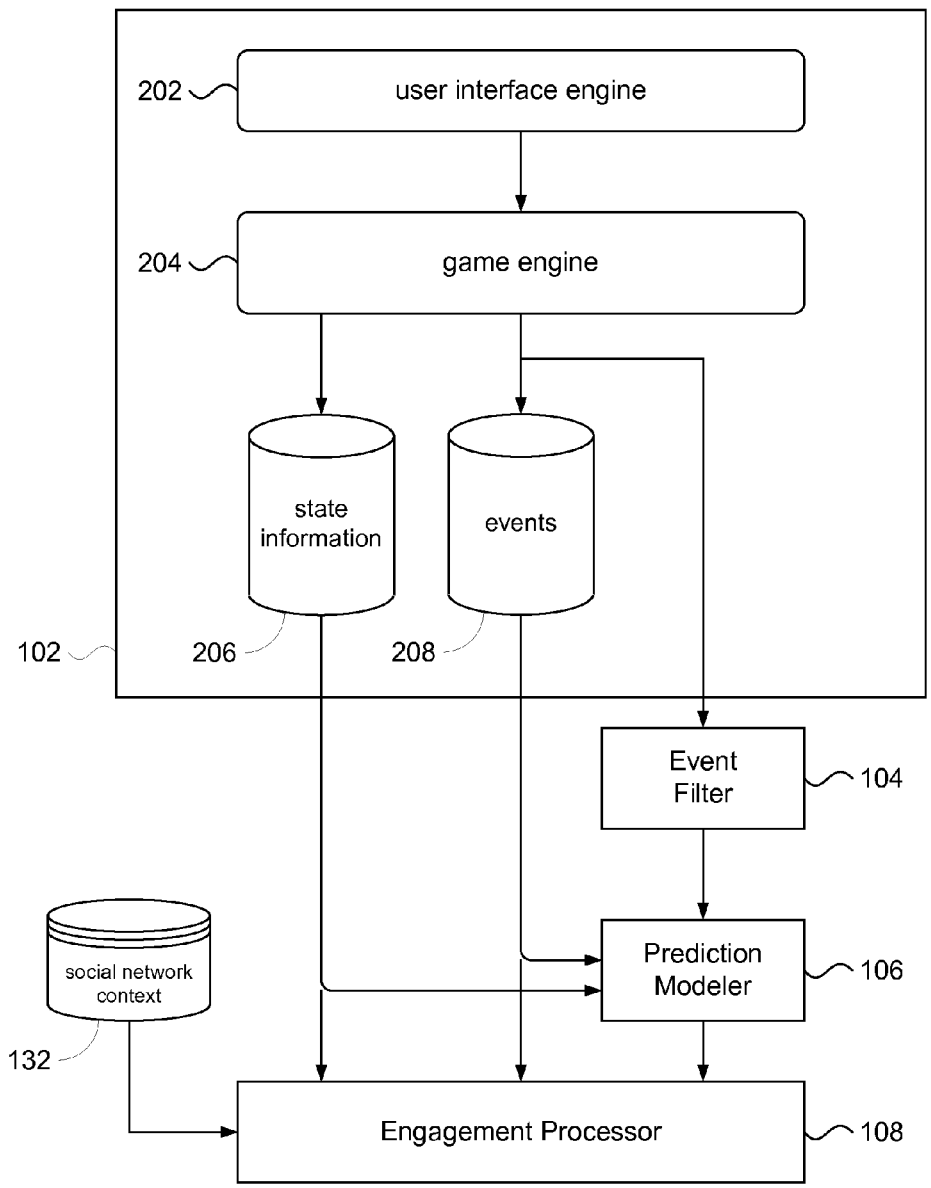
FIG. 2 shows details of the game server shown in FIG. 1.

FIG. 2 shows some additional details of the game server 102 in accordance with the present disclosure. The game server 102 may include a user interface engine 202, a game engine 204, a state information data store 206, and a game events data store 208. The user interface engine 202 may provide graphics rendering capability to produce video and other display information for game play. Input processing from various input devices (e.g., mouse device, keyboard, and so on) may be processed through the user interface engine 202. Access to the gaming system 100 may be provided over the Internet (e.g., via a web browser) or a game application (e.g., executing on a computing device such as a laptop computer, a smartphone, a computer tablet, and so on). For example, the user interface engine 202 may provide a Web services interface for access over the Web. In some embodiments, the user interface engine 202 may interface with a player's game console over the Internet.

The game engine 204 may provide rules processing, event generation and processing, game mechanics, a game environment, and other game infrastructure to manage game play. Players and the game environment (e.g., non-player game elements, and the like) have states (e.g., player is alive and has 1000 experience points, a structure has be destroyed, etc.) that change during game play. The game engine 204 may manage these state changes (collectively referred to as "game state") according to game rules which govern game play. The state information data store 206 may store and manage the game state, including current game state information of the players (e.g., health levels, experience levels, location, possessions, achievements, etc.) and current game state information of the game environment (e.g., number of players in the game, health levels of game elements such as structures and creatures, time of day in the game, etc.).

The game engine 204 may identify the occurrence of game events during game play. In some embodiments, game events may be defined by the game rules. When a game event is deemed to have occurred, the game engine 204 may issue an event (e.g., an event message) to other elements of the game engine. In some embodiments, the game engine 204 may store generated game events in the event data store 208. The game engine 204 may include a time base to synchronize the game state and the game events. Game play may be recorded by storing all the game state changes and game events in the data stores 208, 206.

The game engine 204 may provide the game events to the event filter 104 in addition to being stored in the events data store 208. Game state information and game events may be accessed by the predication modeler 106 via the state information data store 206 and the events data store 208, respectively. The prediction modeler 106 may use game state information and game events to predict the behaviour of a player (e.g., player 122) identified in the event filter 104. By using the current game state of the game environment and the players in the game, the prediction modeler 106 can make a prediction of the what the player is likely to do.

Likewise, the engagement processor 108 may access the state information data store 206 and the events data store 208 to inform the process of generating one or more engagement actions for engaging with the player. The engagement processor 108 may access the social network context 132 to further inform the process of generating suitable engagement actions. By using the current game state and current state of the player, the engagement processor 108 may generate engagement activity that is highly relevant to the player's current situation in the game, thus encouraging engagement by the player who may benefit from the engagement.

Figure 3:
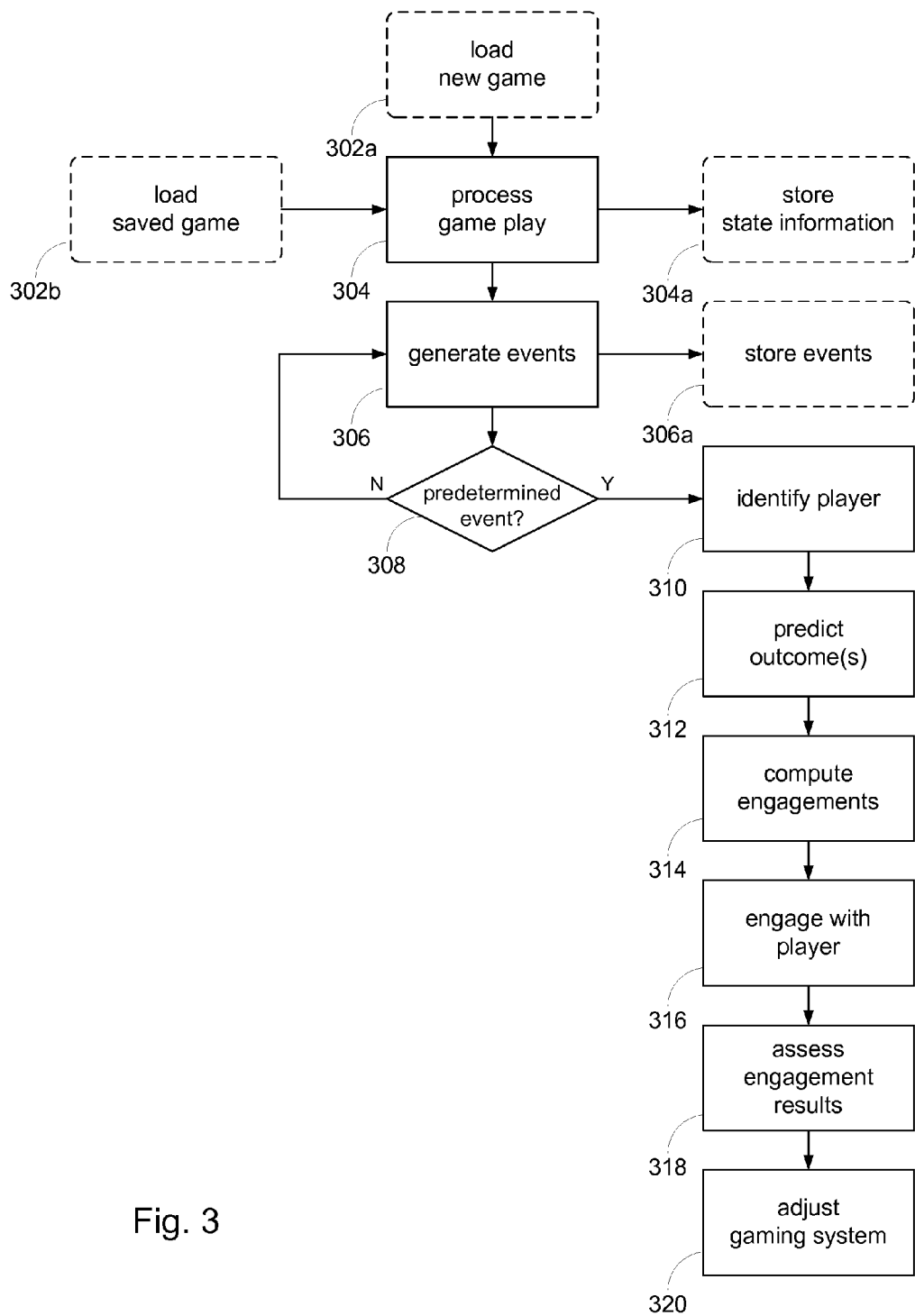
FIG. 3 depicts a workflow within the gaming system according to the present disclosure.

Referring to FIG. 3, a workflow in the gaming system 100 in accordance with the present disclosure includes loading a game. The gaming system 100 may load new game 302a, or the gaming system may load a previously saved game at 302b. At 304, the gaming system 100 may process game play. In the case of a newly initialized game (at 302a), the gaming system 100 may manage game play as players interact with each other in the game environment or with elements in the game environment from the game's initial game state.

If a previously saved game was loaded (at 302b), the gaming system 100 may continue with game play from the game state at the save point. Changes in the state of the players and in the game environment as game play progresses, whether in a new game or from a saved game, may be stored (at 304a) in the state information data store 206. On the other hand, if the previously saved game that was loaded at 302b is simply being replayed, as one would replay a previously recorded video recording, then the processing of game play at 304 will not include storing state information (304a) since no changes of state will occur by simply replaying the previously saved game.

At 306, the game engine 204 may generate game events as game play progresses, whether in a new game or from a previously saved game. Any occurrence in the game environment or with the players during game play may be treated as a game event. In some embodiments, the occurrence of a series of game events may be treated as a game event. At 306a, game events generated during game play may be stored in the event data store 208. On the other hand if a previously saved game is simply being replayed, then processing at 306a is not needed since game events generated at 306 are simply the result of replaying a previously recorded game.

In some embodiments, processing from 308 and following may proceed irrespective of whether the game is being played out or a previously saved game is being replayed. Game events are presented to the event filter 104. The event filter 104 monitors game events and looks for predetermined game events at 308. In accordance with the present disclosure, the event filter 104 serves to identify a player at 310 based on certain game events. The player becomes the target of an engagement, for example, to encourage the player to increase their participation in the game. The event filter 104 may be triggered based on situational game events. For example, when a new player first logs onto the game, the event filter 104 may identify that player as a target for engagement. If the player levels up, or if the player has died for the fifth time, and so on, the event filter 104 may be triggered to identify the player associated with the event as a target for engagement. The event filter 104 may be triggered based on temporal game events; e.g., the player has played for six straight hours, or it has been 48 hours since the player registered as a new player, or the player reached a certain level within a certain period of time, and so on. A game event may be triggered if the player has not logged into the game for some period of time.

When the event filter 104 has identified a player at 310, the prediction modeler 106 may be invoked at 312 to make one or more predictions (outcomes) as to what the player may do under the given circumstances. For example, if a player is killed during game play, that game event (death of a player) may be used to identify the player as a subject for the prediction modeler 106.

In some embodiments, the prediction modeler 106 may implement and evaluate any one or more known predictive algorithms, such support vector machines, linear regression models, decision trees, etc., to model the player's behaviour. Inputs (prediction variables) to the prediction modeler 106 depend on the particular algorithms and on the training data used to develop the models. Accordingly, prediction variables may be based on game events that occur during game play, the player's game state, the game state of other players, the state of the game environment, and so on.

In some embodiments, outcomes of interest that may be predicted by the predictive algorithms may include the player quitting the game, the player making an initial payment to continue playing the game, the player purchasing a game item, and so on. A player may be predicted to make payments for multiple categories of virtual items. In other embodiments, outcomes may indicate the player is likely to purchase real-life items (e.g., a T-shirt, instruction booklets), and so on. In some embodiments, the predictive algorithms may adapt over time in order to change the nature of the outcomes that are predicted. For example, a predicted outcome for a new player may be a decision to register as a paying player, whereas a player who has played for some number of months may be predicted to purchase high-end gaming items in order to advance or otherwise enhance their game play.

The outcome(s) predicted by the prediction modeler 106 may then be processed by the engagement processor 108, at 314, to generate engagement activities, such presenting one or more recommendations or suggestions, offers to purchase real or virtual items, and so on with which to engage the player. For example, suppose the player was identified by the death of the player, the engagement activity may be a recommendation to the player to take some action to avoid dying on the next go around. The engagement may be to offer the player to buy a virtual item; e.g., a weapon, or a potion, etc. In general, the engagement processor 108 may generate some form of engagement activity to engage the player identified at 310 and modeled at 312 to encourage continued interest in the game, to further their progress in the game, and so on.

In some embodiments, the engagement processor 108 may comprise a hybrid recommender system. Hybrid recommender systems are known and may comprise a combination of two or more single recommender systems. The engagement processor 108 may include expert rule processing to process the game context to further inform the process of generating the engagement activity. As a simple example, suppose the predicted outcome indicates that the player is likely to purchase items from the game. If the current game environment is that the player is in a burning building and the player is very low on health, then the engagement processor 108 may generate an engagement action comprising an offer to sell a "transport spell" to the player so that the player can teletransport out of the burning building.

In some embodiments, the engagement processor 108 may incorporate information from a social network context 132 to further inform the process of generating a suitable engagement activity. For example, the social network context 132 may comprise a list of players who are teamed up with the identified player in a cooperative game, or a list of players with whom the identified player communicates in the game. The game mechanics may provide a formal social networking infrastructure within the game environment. The engagement processor 108 may generate engagement activity based on actions of the other players in the identified player's social network. For example, if other players in the identified player's social network encountered the same situation confronting the identified player, the engagement action may be a hint as to what those players did to resolve the situation.

It can be appreciated from the foregoing examples that the engagement activity may be any kind of engagement with the player, and is not limited to selling items to the player. The engagement activity may include providing tips for game play, introducing the player to other players, and so on to help the player succeed in the game and thus continue playing the game. The engagement activity may serve to reduce the likelihood of churn; i.e., the player leaving the game. For example, the player may leave the game if they become bored or frustrated. Accordingly, the engagement activity may present new challenges to the player, or may include tips and tricks to overcome an obstacle that may be the source of frustration. And so on.

The engagement activity generated in 314 may then be put into action at 316. For example, if the player has been killed, the gaming system 100 may respawn the player and engage the player by providing hints, offering weapons, and so on before the player re-enters the game. The engagement may simply pop up on the player's interface; e.g., in a pop up window. For example, if the player has been stuck in a situation for some period of time (e.g., appears to be lost in building), an engagement action may include popping up a window and offering a suggestion on what to do. The player may be engaged in an off-line manner. For example, an email may be sent to the player, a text message may sent to the player, and so on. In some embodiments, for example, the engagement may include an interactive avatar such as disclosed in concurrently filed U.S. application Ser. No. 13/659, 517.

The assessor 108 may assess the effectiveness of the engagements, at 318. For example, the assessor 108 may track the success rate of engagement actions that are offers to sell a particular gaming item. The tracking information may include the circumstances under which the offer was made, the players' game states, the pricing structure, and so on. The assessor may track different kinds of advice that were given to players and what happened with those players (did they leave, did they buy things, etc.). The assessments may be displayed on a display device, or a report may be generated, and so on.

At 320, the system administrator 112 may make adjustments to the gaming system 100. In some embodiments, the system administrator's adjustments may be based on the assessments made by the assessor 108 at 318. Generally, any aspect of the gaming system 100 may be adjusted. For example, the game server 102 may be adjusted to change the difficultly level of some game elements, the pricing and price structure of virtual items may be changed. The event filter 104 may be adjusted to identify new types of players for targeting engagements. New prediction algorithms may be added to the prediction modeler 106, or existing algorithms may be tuned in order to improve prediction accuracy. The engagement processor 108 may be adjusted to refine the engagement activity, for example, to apply certain engagements for certain groups of players, alter the way the different players are engaged such as whether to engage during game play or offline, etc. The adjustments serve as feedback into the gaming system 100, thus tuning the gaming system to provide the best gaming experience for players while at the same providing opportunities to improve the revenue stream from the gaming system.

Referring for a moment to FIG. 1, the prediction modeler 106 may employ player models that analyze historic player behavior as a basis for making predictions relating to players purchasing virtual items (e.g., experience points, weapons, ammunition, equipment, food, and so on) in the game. In some embodiments, the prediction modeler 106 may make predictions of players making their first payments. In accordance with principles of the present disclosure, the prediction modeler 106 may include a player model that predicts whether an identified player, under their current circumstances, will make their first payment. For those players who are predicted to make a payment, subsequent player models may be evaluated to predict the virtual item(s) they will make a payment for.

Figure 4:
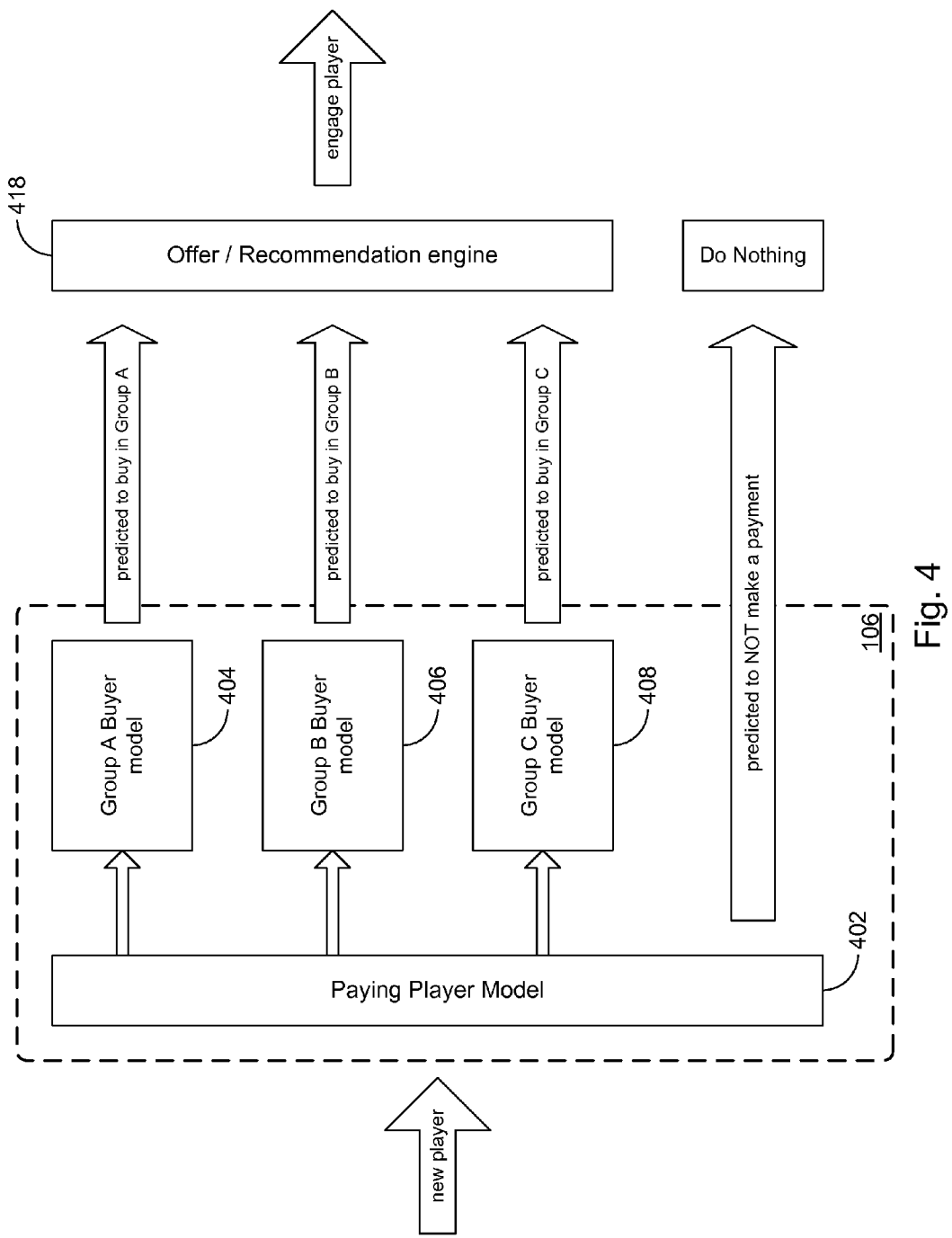
FIG. 4 illustrates a configuration for prediction modeling in accordance with the present disclosure.

FIG. 4 illustrates a configuration of the prediction modeler 106 in accordance with some embodiments. The prediction modeler 106 may include a first player model 402. The first player model 402 may be evaluated against an identified player (e.g., 310 in FIG. 3) to predict the player as being a paying player or not. More particularly, the first player model 402 may make a prediction about whether the player is going to spend money at all, irrespective of how the money is spent. In accordance with the present disclosure, the first player model 402 does not make a prediction about the player making a purchase of a specific virtual item.

The prediction modeler 106 may include secondary player models 404, 406, 408 to refine the prediction made by the first player model 402, namely by making predictions about virtual items in the game that the identified player will buy. In some embodiments, the secondary models make predictions in terms of categories of virtual items. For example, a player model may be developed for each such category to make a prediction that basically answers the question "Is the player predicted to buy a virtual item in this category?" FIG. 4, for example, shows three secondary player models 404, 406, 408 for three categories of virtual items: Group A, Group B, Group C, respectively. It will be appreciated, of course, that any number of categories may be defined for the particular game being played.

In some embodiments, virtual items may be grouped in categories such as "consumable items" (e.g., food, fuel, ammunition, experience points, health points, etc.), "durable items" (e.g., weapons, keys, transportation, etc.), "knowledge items" (e.g., maps, recipes for potions, spells, secret phrases, etc.), and so on. Categories may be defined according to their function (e.g., fighting, construction, transportation, etc.), category definitions may incorporate the player's game state (e.g., fighting, trapped, low health, etc.), and so on. As can be appreciated, categories may be defined according to any criteria that are suitable for the particular game being played.

Any of the known classification algorithms may be used (e.g., logistic regression, random forest, support vector machines, etc.) to develop the player models 402-408. As known by those of ordinary skill, a player model may be developed by using existing data from a sample player population as "training" data. The training data, for example, may be collected from a recorded game. A developer may evaluate each of the players in the sample player population at the time when they made their first payment in order to develop the first player model 402. For example, the virtual item(s) involved in the players' first payments and their circumstances (e.g., their game state, the state of the game at the time of the first purchase, events, and so on) may be probative for predicting when new players will make their first payment.

The developer may then evaluate the players in the sample player population to identify predictor variables for modeling when a player may make a payment for virtual items of a given category (e.g., Group A), to develop secondary player model 404. The developer repeat this for Group B and Group C virtual items to develop the secondary player models 406 and 408.

The training data may then be applied to test and refine the first player model 402 and the secondary player models 404-408. The final player models 402-408 may then be used to make predictions of a player making a payment in the game (e.g., purchase one or more virtual items).

It is noted that the identified player may be predicted to make a payment on virtual item(s) from one or more categories, Group A, B, or C. Accordingly, the predicted outcomes from each model 404, 406, 408 may feed into an offer/recommendation engine 418 in the engagement processor 108 (FIG. 1). Suitable engagement activity may be generated by the offer/recommendation engine 418 for each category that the identified player is predicted to make a payment in. As explained in 316 in FIG. 3, the game system 100 may engage the identified player in accordance with the generated engagement activity.

The foregoing may be especially useful where the identified player is a new player who has not yet made a payment in the game. For example, the identified player may not be registered as a paying player, in which case, the engagement may be to offer a special deal to motivate such a player to register and become a paying player. In another example, the identified player may be a registered paying player, but has not yet purchased a virtual item in the game, in which case the engagement may be to make an offer or recommendation to motivate such a player to make their first purchase in the game.

Figure 5:
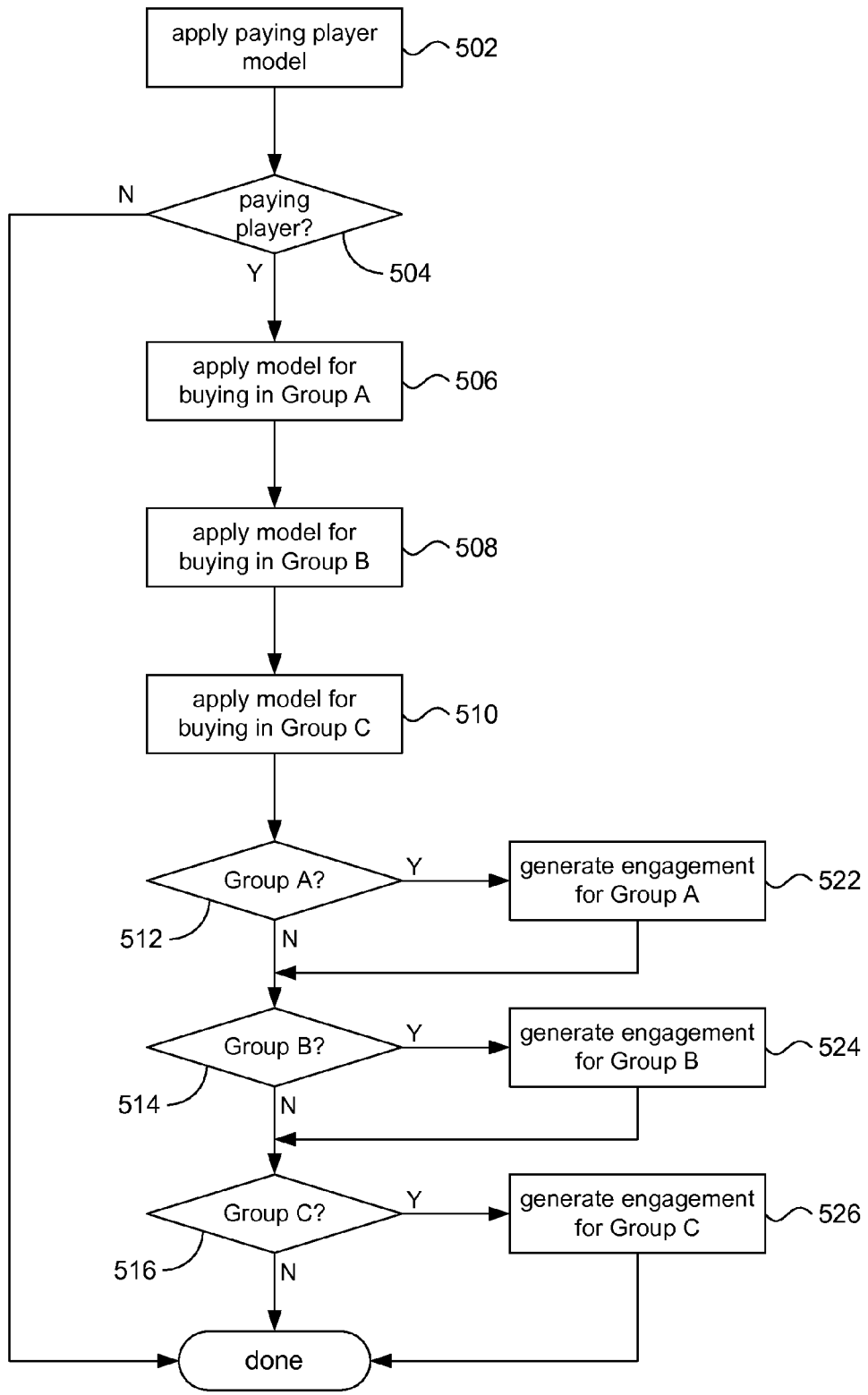
FIGS. 5 and 5A illustrate workflows for payment prediction in accordance with the present disclosure.

FIG. 5 illustrates a typical workflow in the configuration shown in FIG. 4, according to some embodiments. An identified player (e.g., 310 in FIG. 3) is evaluated at 502. In some embodiments, the player that is identified at 310 may be a player who has not yet made a payment in the game. The player may be a registered player (i.e., has paid an initial registration fee), but has not otherwise made any payments to buy any of the virtual items in the game. Accordingly, such a "new" player may be evaluated at 502 using the first model (e.g., paying player model 402) to determine if the identified player is predicted to make a payment. If, at 504, the player is predicted NOT to make a payment, then the workflow may terminate.

If, at 504, the player is predicted to make a payment, then the player may be evaluated using one or more subsequent models to predict what virtual item(s) the player may make payments for. Using the illustrative configuration shown in FIG. 4, as an example, the player may be evaluated, at 506, using player model 404, which models players who make payments to buy virtual items from a category of virtual items called Group A. The player may similarly be evaluated, at 508 and 510, using respective player models 406 and 406, which model players who make payments to buy virtual items in categories Group B and Group C, respectively.

Any predicted outcomes from 506, 508, and 520 may then feed into the engagement processor 108 (FIG. 1) for processing. Accordingly, at 512, if the player is predicted to make a payment for virtual items of Group A, then at 522, the engagement processor 108 may generate a suitable engagement. For example, the player may be presented with a pop-up screen and shown a list of virtual items in Group A that the player can purchase. In some embodiments, the engagement processor 108 may take into account the current game state and the player's game state to make a more directed offer for a virtual item(s) that is relevant to the player's current situation in the game.

If the player is not predicted to make a payment for a virtual item of Group A, then an engagement will not be generated. This may be advantageous to avoid what the player may perceive as getting "spammed" by offers, recommendations, or other engagement activity for something the player is not likely to need or want. Accordingly, the workflow proceeds to 514. If, at 514, the player is predicted to make a payment for virtual items of Group B, then at 524, the engagement processor 108 may generate a suitable engagement to offer the player virtual items in Group B for purchase. Again, no engagement is made if the player is not predicted to make a payment for virtual items of Group B, thus avoiding any negative impacts of making offers or suggestions that the player may not be interested in. At 516, if the player is predicted to make a payment for virtual items of Group C, then at 526, the engagement processor 108 may generate a suitable engagement to offer the player virtual items in Group C for purchase. The process may continue if additional categories are defined.

According to the workflow, the gaming system 100 may engage the player in connection with one or more groups of virtual items; i.e., engaging the player in one group does not exclude the possibility of engaging the player in another group. Since the player may be open to the idea of purchasing virtual items from multiple groups, the gaming system 100 can increase the likelihood of consummating a sale by engaging the player in as many groups of virtual items as the player is predicted make a payment in.

FIG. 5 makes predictions on categories of virtual items. In other words, predictions are made whether a player will make a payment for a virtual item in a given category, and not for the virtual item itself; i.e. the category is modeled not the virtual items in the category.

Figure 5A:
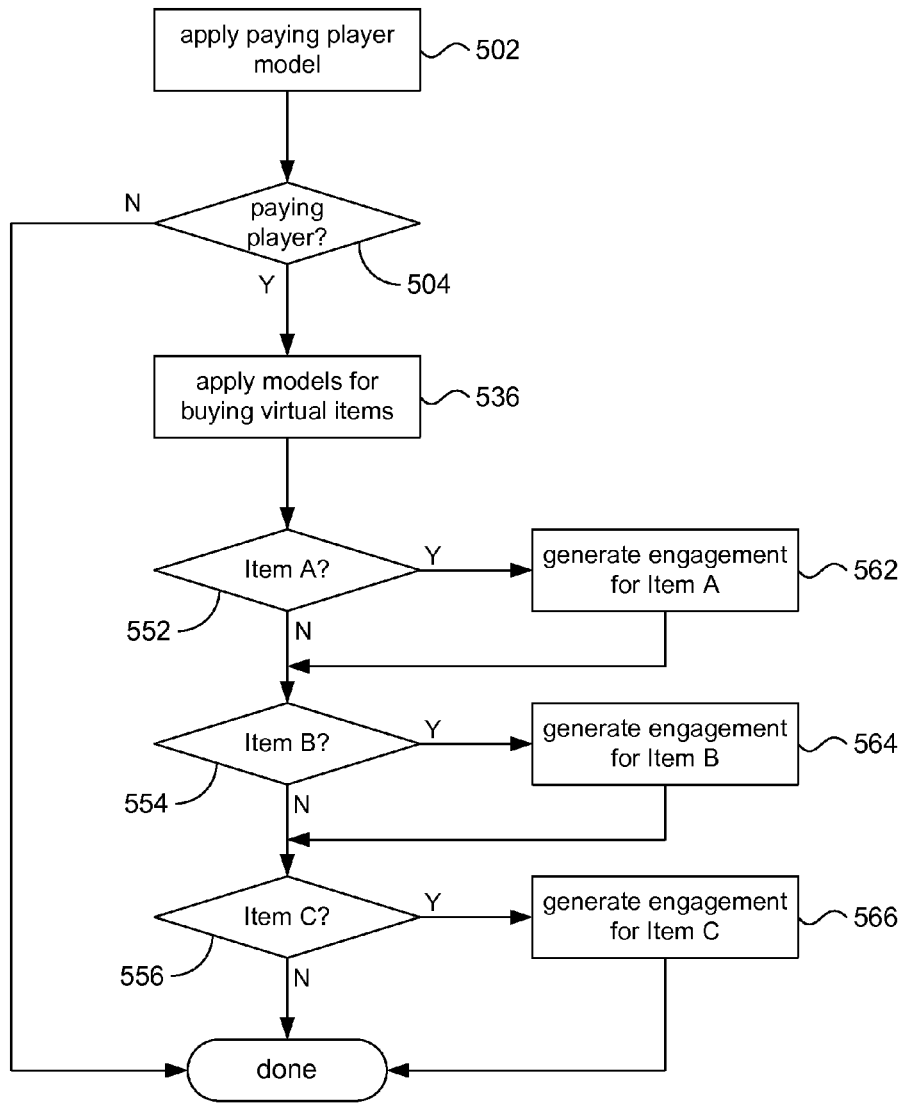

Referring to FIG. 5A, in some embodiments, predictions may be made on a per virtual item basis. Thus, as will be explained below, predictions may be made whether a player will purchase a gun, or perhaps a specific gun (e.g., a rifle vs. a chain gun). Accordingly, the "new" player (e.g., identified at 310 in FIG. 3) may be evaluated at 502 against the first model (e.g., paying player model 402) to determine if the identified player is predicted to make a payment. If, at 504, the player is predicted NOT to make a payment, then the workflow may terminate.

If, at 504, the player is predicted to make a payment, then at 536, the player may be evaluated against several models. Each model may predict whether the player is going to purchase a specific virtual item. For example, there may be a model for a map of the game. There may be a model for a hint book. There may be a model for some health points. There may be models for specific weapons. And so on.

It will be appreciated that, in general, providing a model for each virtual item in the game may not be practical, since a game may have many tens to hundreds of virtual items. However, there may be situations where the gaming system 100 may want to offer the player only a limited number of virtual items. For example, a player who is new to the game or is inexperienced in the game may be overwhelmed if they were offered a large number of virtual items to purchase. Accordingly, such a player may initially be exposed to only a small set of virtual items to purchase. In some embodiments, then, the player may be evaluated at 536 using a small number of models to predict whether the player is likely to buy one or more of a small number of virtual items. As an illustration, it can be assumed, without loss of generality, that the evaluation at 536 evaluates three player models, one for each of virtual items A, B, and C.

At 552, if the player is predicted to make a payment for virtual item A, then at 562, the engagement processor 108 may generate a suitable engagement to offer to sell virtual item A to the player. If the player is not predicted to make a payment for virtual item A, then no engagement is made, thus avoiding alienating the player with un-solicited and otherwise irrelevant engagement activity that may be perceived "spamming" the player. The process is repeated at 554 and 564 for virtual item B, at 556 and 566 for virtual item C, and so on for each virtual item that the player is predicted at 536 to make a payment for.

A portion of the workflow shown in FIG. 3 is reproduced in FIGS. 6A and 6B, which emphasizes the prediction of players to make payments in the workflow. Consider first FIG. 6A. At 602, the gaming system 100 may conduct game play among players, which may include loading a new game or loading a saved game and continuing from the saved point. A player may be identified at 604. In some embodiments, the player that is identified is one who has not yet made a payment in the game.

At 606, the player is evaluated to predict one or more groups of virtual items the player is going to make payments on. For example, in some embodiments, the processing described in FIG. 5 may be conducted. If 606 does not result in any predicted outcome, then the workflow may terminate. More significantly, the player will not be engaged by the gaming system 100, since the player is not predicted to make any payments. If 606 does result in one or more predicted outcomes, then at 608, the predicted outcomes may be used by the engagement processor 108 to generate one or more suitable engagement actions with which to engage the identified player. For example, the player may be offered to purchase a virtual item from among a group of virtual items.

Referring to FIG. 6B, in some embodiments, predictions may be made on specific virtual items rather than on groups of virtual items. Blocks 622 and 624 in FIG. 6B correspond to respective blocks 602 and 604 in FIG. 6A. At 626, player models may be applied to the player to identify one or more specific virtual items the player is predicted to make a payment on. At 628, the engagement processor 108 may generate one or more suitable engagement action(s) with which to engage the identified player based on the virtual items predicted at 626. For example, the player may be offered to purchase the specific virtual item that was predicted at 626.

Figure 7:
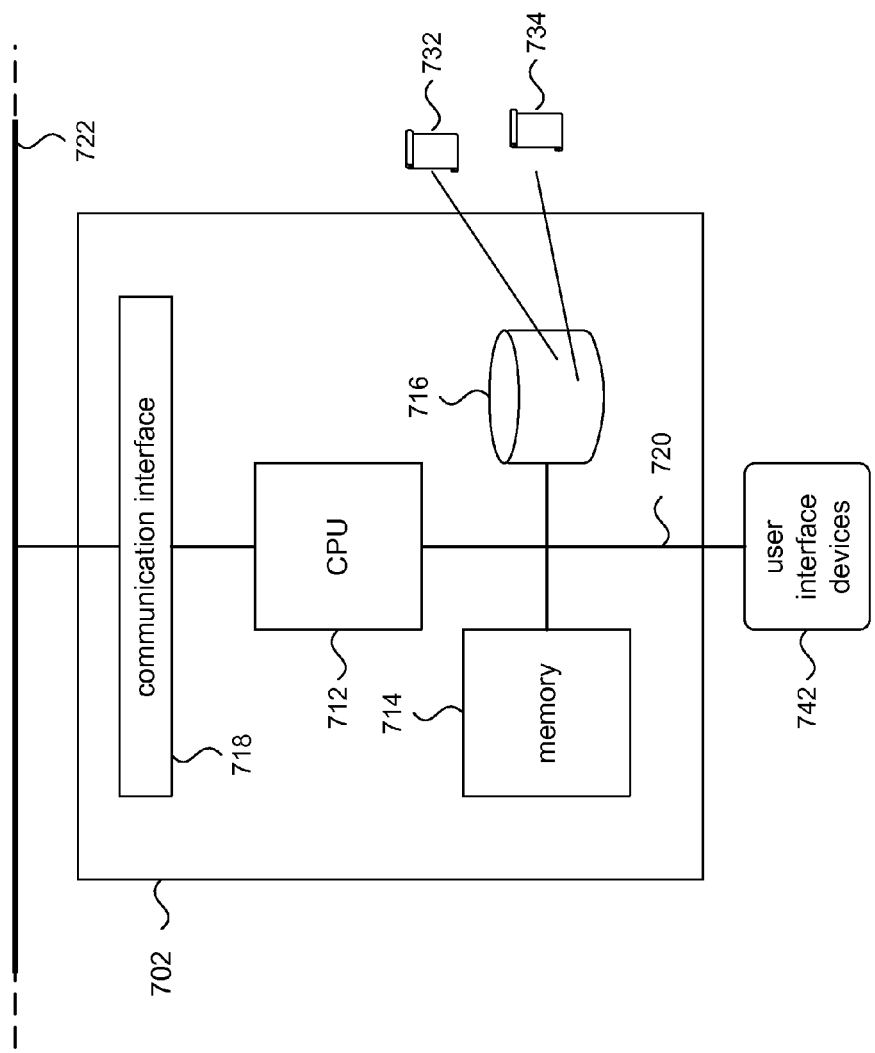
FIG. 7 illustrates a specific embodiment of the gaming system of the present disclosure.

FIG. 7 illustrates a high level block diagram of a computer system 702 configured and programmed to operate as gaming system 100 in accordance with the present disclosure. The computer system 702 may include a central processing unit (CPU) 712 or other similar data processing component. The CPU 712 may be a single processor or a multiprocessor subsystem. The computer system 702 may include various memory components. For example, the memory components may include a volatile memory 714 (e.g., random access memory, RAM) and a data storage device 716. A communication interface 718 may be provided to allow the computer system 702 to communicate over a communication network 722, such as a local area network (LAN), the Internet, and so on, allowing players to access the computer system 702 over the Internet. The communication interface 718 may provide Web services via a suitable Web services interface. An internal bus 720 may interconnect the components comprising the computer system 702.

The data storage device 716 may comprise a non-transitory computer readable medium having stored thereon computer executable program code 732. The computer executable program code 732 may be executed by the CPU 712 to cause the CPU to perform steps of the present disclosure, for example the processing set forth in FIGS. 5 and 5A. In some embodiments, the CPU may evaluate player models to predict groups of virtual items or specific virtual items that the player is predicted to make payments on. The data storage device 716 may store various data structures 734 including, for example, game state information and game events, player segments, and so on. The data storage device 716 may represent either or both the state information data store 206 and the events data store 208.

The system administrator 112 may interact with the computer system 702 using suitable user interface devices 742, including for example, input devices such as a keyboard, a keypad, a mouse or other pointing device, and output devices such as a display.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a gaming system comprising operating a computer system in the gaming system to perform steps of:
   providing game play among a plurality of players in a game;
   identifying a first player among the plurality of players;
   evaluating a first model to make a first prediction of whether the first player is going to make a payment;
   upon determining that the first player is predicted to make a payment, refining the first prediction by evaluating at least a second model to make a second prediction that the first player will purchase a first virtual item;
   using the second prediction to generate one or more engagement actions for the first player that include an offer to sell the first virtual item; and
   communicating with the first player in accordance with the one or more engagement actions.

2. The method of claim 1 wherein the identified player is a player who has not previously purchased any virtual items in the game.

3. The method of claim 1 wherein virtual items in the game are categorized into a plurality of categories, wherein generating one or more engagement actions for the first player is based on a category that the first virtual item is categorized in.

4. The method of claim 3 wherein the engagement actions include making a recommendation to purchase one or more virtual items in the identified category that the first virtual item is categorized in.

5. The method of claim 1 further comprising evaluating a plurality of second models to identify one or more categories of virtual items that the first player is predicted to make payments in.

6. The method of claim 1 wherein the first player is engaged during game play.

7. The method of claim 1 wherein the engagement actions include making an offer or recommendation to purchase the first virtual item.

8. A gaming system comprising:
   a computer system;
   a data storage device having stored thereon computer executable program code, which when executed by the computer system causes the computer system to:
   provide game play among a plurality of players in a game;
   identify a first player among the plurality of players;
   evaluate a first model to make a first prediction of whether the first player is going to make a payment;
   upon determining that the first player is predicted to make a payment, refining the first prediction by evaluating at least a second model to make a second prediction that the first player will purchase a first virtual item;
   use the second prediction to generate one or more engagement actions for the first player that include an offer to sell the first virtual item; and
   communicate with the first player in accordance with the one or more engagement actions.

9. The gaming system of claim 8 wherein the identified player is a player who has not previously purchased any virtual items in the game.

10. The gaming system of claim 8 wherein virtual items in the game are categorized into a plurality of categories, wherein generating one or more engagement actions for the first player is based on a category that the first virtual item is categorized in.

11. The gaming system of claim 8 wherein the engagement actions include making an offer or recommendation to purchase one or more virtual items in the identified category that the first virtual item is categorized in.

12. The gaming system of claim 8 wherein execution of the computer executable program code further causes the computer system to evaluate a plurality of second models to identify one or more categories of virtual items that the first player is predicted to make payments in.

13. The gaming system of claim 8 wherein the first player is engaged during game play.

14. The gaming system of claim 8 wherein the engagement actions include making an offer or recommendation to purchase the first virtual item.

15. A non-transitory computer-readable storage medium having stored thereon computer executable program code, which when executed by a computer system causes the computer system to perform steps comprising:
   providing game play among a plurality of players in a game;
   identifying a first player among the plurality of players;

evaluating a first model to make a first prediction of whether the first player is going to make a payment;

upon determining that the first player is predicted to make a payment, refining the first prediction by evaluating at least a second model to make a second prediction that the first player will purchase a first virtual item;

using the second prediction to generate one or more engagement actions for the first player that include an offer to sell the first virtual item; and communicating with the first player in accordance with the one or more engagement actions.

16. The non-transitory computer-readable storage medium of claim 15 wherein the identified player is a player who has not previously purchased any virtual items in the game.

17. The non-transitory computer-readable storage medium of claim 15 wherein the engagement actions include making an offer or recommendation to purchase one or more virtual items in the identified category that the first virtual item is categorized in.

18. The non-transitory computer-readable storage medium of claim 15 further comprising evaluating a plurality of second models to identify one or more categories of virtual items that the first player is predicted to make payments in.

19. The non-transitory computer-readable storage medium of claim 15 wherein the first player is engaged during game play.

20. The non-transitory computer-readable storage medium of claim 15 wherein the engagement actions include making an offer or recommendation to purchase the first virtual item.

\* \* \* \* \*